LOUIS A. KOCH JR. Inventor

Patented Jan. 29, 1935

1,989,139

UNITED STATES PATENT OFFICE 1,989,139

DYNAMO COOLING MEANS

Louis A. Koch, Jr., Louisville, Ky.

Original application November 5, 1932, Serial No. 641,481. Divided and this application December 4, 1933, Serial No. 700,853

6 Claims. (Cl. 290—1)

This invention is a division of my application Ser. No. 641,481, filed November 5th, 1932, and pertains to providing an attaching apparatus to standard enclosed dynamo electric machines installed on automotive vehicles without disturbing or making any alterations in same.

The main object is to instantly equip the dynamo with effective air cooling means for the purpose of procuring with safety to the electrical components a greater volt ampere output than that for which it was originally organized, by utilizing air currents incident to the operation of the automotive vehicle and/or the associated elements of an internal combustion engine installed thereon.

In the drawing

Structure and operation

Figure 1:
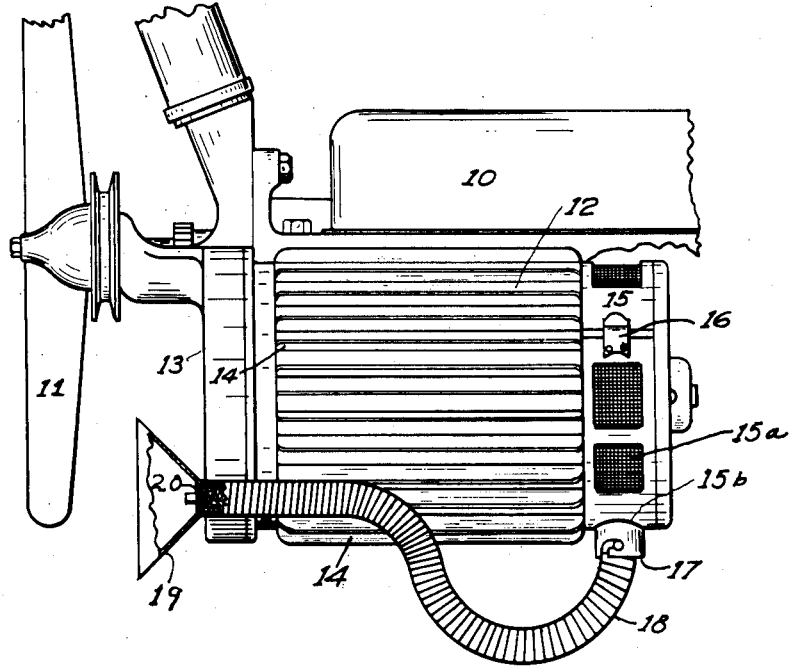
Figure 1 represents a portion of an automotive internal combustion engine with a radiator cooling fan and a dynamo electric machine mounted thereon and operated thereby.
Figure 2:
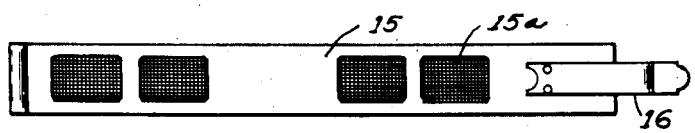
Fig. 2 is a plan view of a commutator opening cover or "window strap", somewhat foreshortened.
Figure 3:
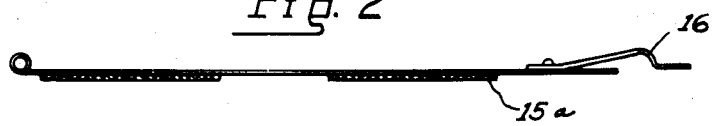
Fig. 3 is an elevational view of Fig. 2.

Numeral 10 indicates a portion of an internal combustion engine, 11 a radiator cooling fan mounted thereon and arranged to be driven by a belt from a rotating part of the engine. 12 is a dynamo electric machine, flange mounted on to gear case 13 in the conventional way, 14 are fins projecting from the field housing of the generator, for the purpose of conducting internal heat to the surface for radiation and dissipation by the air currents created by the moving vehicle and/or those set up by the fan 11. 15 is a cover for the conventional openings in the housing to permit access for adjustment and service to the commutator and brushes lodged immediately thereunder. This cover strap preferably completely encompasses the housing and is snapped into place by latch 16, however, other means for readily securing can be substituted. This strap is provided with openings, some of which are closed with a foraminous material 15a, while one opening, as at 15b, is used to make connection with shell 17, which is shown fashioned for a bayonet connection with flexible air tube 18 which extends toward the other end of the generator, or forward end of an automotive vehicle, where the opening is equipped with a funneled body 19 located adjacent the fan 11, in order that a portion of the air flow created thereby will be forceably directed into this funnel for conductance to the underneath side of the generator opening in order that cooling air will be forced across the commutator with a minimum of turbulence and out of the other openings for the purpose of cooling the interior of the generator, especially the commutator and brushes for the purpose of increasing the volt ampere output capacity of standard stock generators without impairment from excessive heating which would result from a relatively excessive output in terms of normal capacity, now exacted from generators to supply the ever increasing demands for the present day electrical equipment of automobiles.

It will be noted that the tube 18 and funnel 19 are equipped with a filter 20 and that the open mouth of the funnel is placed in sufficient proximity to the blades of fan 11 in order that they can be utilized to relieve the filter of an important part of its work, i. e. by reason of the heavy particles, entrained in the air being expelled by the forces set up by the revolving fan such as dust and water as they strike the fan. Evidence of the result of this function can be found by observing the "dirt ring" formed on the underside of an automobile hood by the radiator fan. There is a selection of design at this juncture by organizing the fan for the purpose of throwing out or deflecting these particles by impact and/or centrifugal force which is well understood in the art, and simultaneously supplying air for the engine and generator. Other portions of the air flow established by the fan will pass over the openings 15a and assist the above mentioned air to pass through the generator.

The arresting and elimination of entrained water is an important consideration. To this end the filter is placed at the neck of the funnel to arrest not only the remaining damaging solid particles that have been carried beyond the fan, but the major portion if not all of the water thus carried over. Special attention is directed to the fact that water arrested by filter 20 will trickle across its face as the minute particles consolidate in drops sufficiently large to respond to gravity and flow to the inner face of funnel where they continue to flow outwardly against the current of air on its way to effect the objective. Should filter medium be defective, lost or otherwise incompetent, loop 18 is provided as a settling chamber for water that may pass beyond the filter, it being understood that this tube is composed of the conventional flexible tubing, coiled from sheet metal and that while it will conduct air for the purpose as indicated herein, water will seep or leak through the seams and that the interior of the generator will thus be effectively protected against entrained damaging water.

The drawing selected to disclose this invention and the specification thereof are in terms of my improvements in one practical physical form. There are, however, other versions embodying the same principles, some of which employ more and some less structure, consequently obvious modifications, rearrangements and eliminations can be indulged without departing from the spirit of my invention, therefore I wish to be limited only by the following claims.

I claim:

1. In combination, in a prime mover having a cooling means therefor including a fan, a generator driven by the prime mover, and means for collecting, filtering and conducting a portion of the air currents established by the fan into the generator for cooling the latter, said means being so located with respect to the fan that the latter will remove heavy particles from said air before passing through the filtering means, said generator having an air inlet to receive said air, and an outlet for the heated air, said outlet being so located in another portion of the air currents established by said fan that the last mentioned currents will create a suction through said outlet on the air within the generator and assist the first mentioned currents to force air through the generator.

2. In combination, in a prime mover having cooling means therefor including a fan, a generator driven by the prime mover, and means for collecting, filtering and conducting air set in motion by the fan into the generator for cooling the latter, said generator having an air inlet to receive the air, and an outlet for the heated air, said air collecting and filtering means being so located with respect to the fan that the latter will remove heavy particles from said air before passing through said filtering means.

3. In combination, in a prime mover having cooling means therefor including a fan, a generator driven by the prime mover, and means for collecting, filtering and conducting air set in motion by the fan into the generator for cooling the latter, said generator having an air inlet to receive said air, and an outlet for the heated air, said air collecting and filtering means being remotely located from said outlet and so located with respect to the fan that the latter will remove heavy particles from said air before passing through said filtering means.

4. In combination, in a prime mover having a cooling means therefor including a fan, a generator driven by the prime mover, and means for collecting, filtering and conducting a portion of the air currents established by the fan into the generator for cooling the latter, said means being so located with respect to the fan that the latter will remove heavy particles from said air before passing through said filtering means, said generator having an air inlet to receive said air, and an outlet for the heated air.

5. In combination, in a prime mover having cooling means therefor including a fan, a generator driven by the prime mover, an inlet behind said fan for conducting air set in motion by the fan into the generator for cooling the latter, there being an outlet in said generator for the heated air, means associated with said inlet to collect water entrained with the air delivered by said fan and means to discharge said water.

6. In combination, in a prime mover having cooling means therefor including a fan, a generator driven by the prime mover, an inlet behind said fan for conducting air set in motion by the fan into the generator for cooling the latter, there being an outlet in said generator for the heated air, said inlet being so located with respect to said fan that the latter will remove heavy particles from the air set in motion thereby before the latter passes into said inlet, means associated with said inlet to collect water entrained with the air delivered by said fan and means to discharge said water.

LOUIS A. KOCH, JR.